(12) United States Patent
Shen et al.

(10) Patent No.: US 8,320,396 B2
(45) Date of Patent: Nov. 27, 2012

(54) SUBCARRIER GROUP BASED POWER CONTROL FOR OFDMA SYSTEMS

(75) Inventors: Manyuan Shen, Bellevue, WA (US); Guanbin Xing, Issaquah, WA (US)

(73) Assignee: Adaptix, Inc., Carrollton, TX (US)

( * ) Notice: Subject to any disclaimer, the term of this patent is extended or adjusted under 35 U.S.C. 154(b) by 609 days.

(21) Appl. No.: 11/491,470

(22) Filed: Jul. 21, 2006

(65) Prior Publication Data

US 2008/0032731 A1    Feb. 7, 2008

(51) Int. Cl.
*H04J 3/16* (2006.01)
(52) U.S. Cl. ........................................ 370/437; 370/208
(58) Field of Classification Search .................. 370/208, 370/437; 455/500, 522
See application file for complete search history.

(56) References Cited

U.S. PATENT DOCUMENTS

| | | | |
|---|---|---|---|
| 6,072,988 A * | 6/2000 | Minegishi | 455/62 |
| 6,643,521 B1 | 11/2003 | Bourgoin et al. | |
| 2006/0073789 A1 | 4/2006 | Horisaki | |
| 2006/0142040 A1 * | 6/2006 | Jones | 455/522 |
| 2006/0154684 A1 | 7/2006 | Meiyappan | |
| 2008/0076407 A1 * | 3/2008 | Shitara | 455/424 |

FOREIGN PATENT DOCUMENTS

WO    WO 2004/045228 A1 *    5/2004
WO    WO 2006/038694 A1 *    4/2006

OTHER PUBLICATIONS

International Search Report and Written Opinion issued for PCT Application PCT/US2007/073309; Dated: Feb. 14, 2008; 9 Pages.

\* cited by examiner

*Primary Examiner* — Huy D Vu
*Assistant Examiner* — Omer Mian
(74) *Attorney, Agent, or Firm* — Martin & Ferraro, LLP

(57) ABSTRACT

A system and method of wireless communication power control is provided which allows for adjusting power levels without requiring high bandwidth for control. Embodiments allocate subcarriers into unequal power groups, each group having a consistent subcarrier power level. Using interference parameter information from a user, a subcarrier is assigned from a group having adequate power to maintain the user's required power level. In general, users with higher power requirements, such as those near cell boundaries, will be assigned subcarriers from a group having a higher power level. A cell may use a different allocation than a neighbor, so that subcarriers with the highest power level in one cell may not also have the highest power level in a neighboring cell. Such diversity may reduce inter-cell interference of the subcarriers near a cell boundary, since no two subcarriers are transmitted with highest power simultaneously by neighboring base stations.

17 Claims, 2 Drawing Sheets

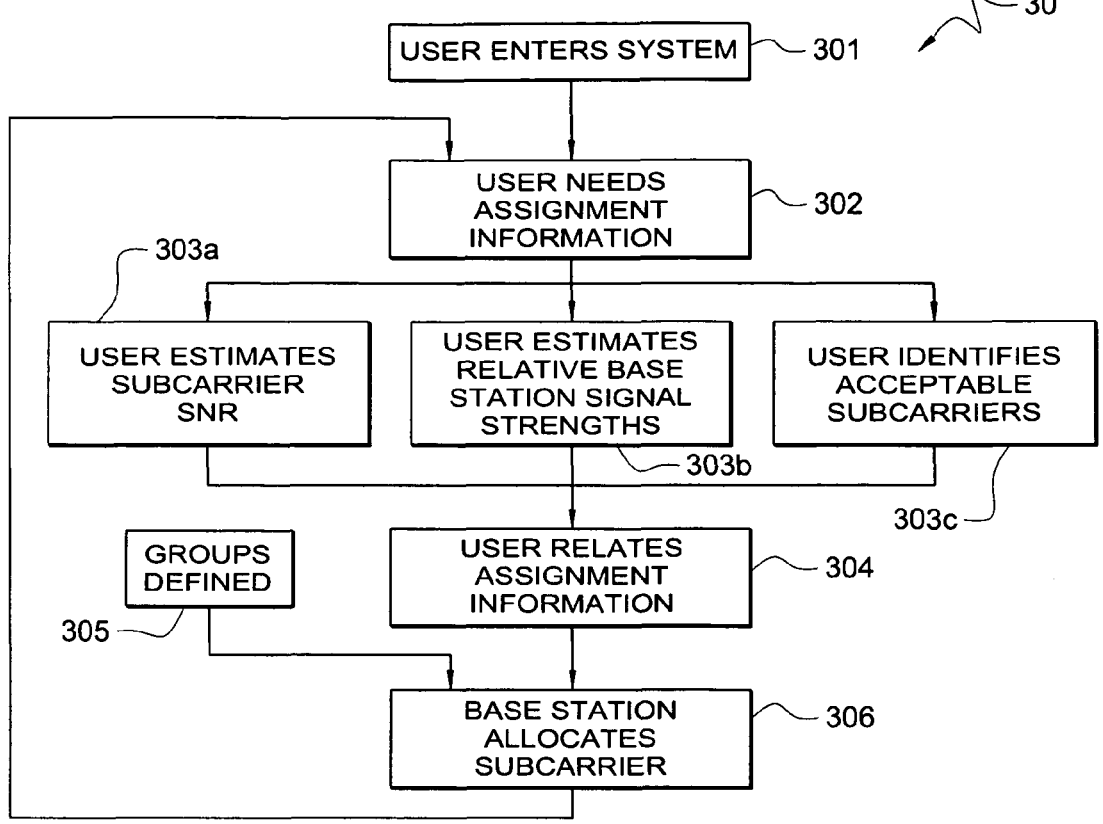
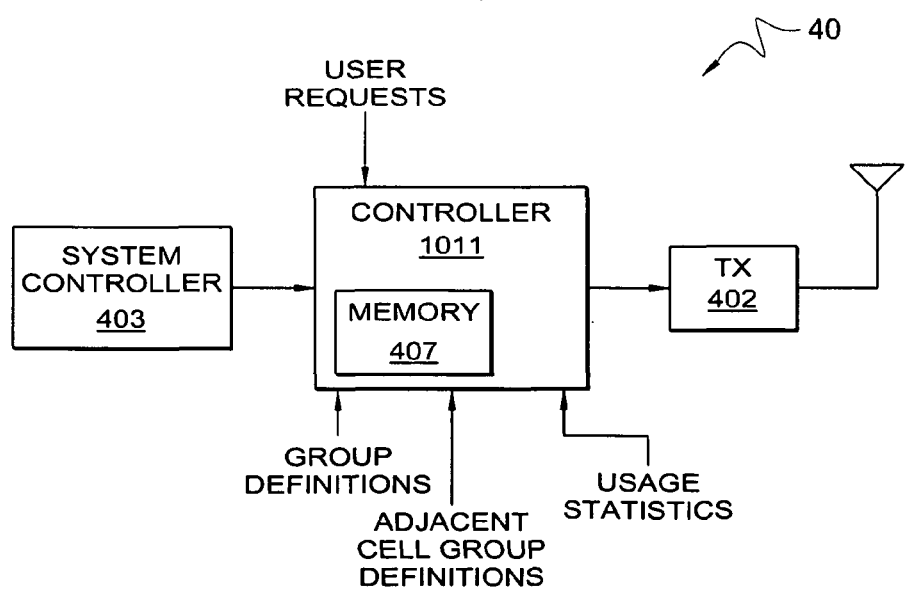

SUBCARRIER GROUP BASED POWER CONTROL FOR OFDMA SYSTEMS

TECHNICAL FIELD

The invention relates generally to wireless power level control, and more particularly, to controlling power levels for subcarriers.

BACKGROUND OF THE INVENTION

For cellular Orthogonal Frequency Division Multiple Access (OFDMA) systems with an aggressive frequency reuse plan, using equal power for all subcarriers in the downlink transmission may lead to severe inter-cell or inter-sector interference. This may then produce undesirable results, such as outages and low system throughput. Individualized power control that is tailored to each specific user can reduce interference, but may use a significant portion of the system bandwidth for power control. This may also reduce system throughput.

With an equal downlink power system, all subcarriers are allocated with equal power. Near cell boundaries, users may experience multi-cell interference, because users may be receiving subcarriers, that were transmitted with equal power, from different base stations at near-equal distance. For a user operating with a particular subcarrier just inside the boundary of one cell, the interfering signal from the base station in an adjacent cell may be nearly as strong as the desired signal. This user may then experience a fairly low signal-to-interference ratio (SIR), which could result in poor quality service, inefficient bandwidth usage or an outage.

Users close to a base station, however, are likely to receive a relatively strong signal which provides a high SIR. Often, the SIR may be higher than is necessary in order to achieve acceptable performance. In some cases, the SIR is high enough that some of the transmitter power may be wasted on diminishing performance gains. An imbalance in SIRs across users, that may range from unacceptably low to potentially wasteful, will hamper the overall system efficiency and throughput.

Alternatively, downlink power control that custom-tailors transmit power based on specific user needs can maintain the range of SIRs across users within a more narrow range of values. Thus, a user nearby a base station may not receive a high power transmission, but rather only enough power to maintain an acceptable SIR. Since the subcarrier allocated to the nearby user may be transmitted with less power than in an equal power system, that particular subcarrier is less likely to interfere with a user in a neighboring cell or sector who is using the same subcarrier.

Unfortunately, in a custom-tailored power system, each user may often need to communicate power control information back to the serving base station in a closed loop configuration. This communication requirement will use system bandwidth for each user, affecting overall system efficiency and throughput. Additionally, the base station may have an additional computational burden attempting to tailor power levels for each user.

BRIEF SUMMARY OF THE INVENTION

Embodiments of the invention provide for group-based power control, wherein subcarriers are grouped according to differing power levels. By using power groups, which may be pre-defined or tailored during operation, the computational burden on the base stations may be reduced. Further, each user may not need to send the same amount of data as in a custom-tailored power system, thereby reducing the bandwidth required for power control.

Power level grouping may divide a plurality of subcarriers into different groups, such that within a group, all the subcarriers have the same power level, but different groups have different subcarrier power levels. Power level groups may be determined arbitrarily, or may use either historical or predicted cell usage loads to provide an appropriate number of subcarriers at different power levels. Groups need not be of the same size, nor does there need to be evenly-spaced power differences between the group with the lowest power level and the group with the highest power level. Embodiments of the invention may have any number of groups, each of any size, and further, the group definitions may vary dynamically. That is, a particular set of groups could be dynamically adjusted, by both moving subcarriers from one group to another, and also by adjusting power levels. Such adjustments may be made in order to provide subcarriers in the proper power ranges to serve the users in a cell, while minimizing interference.

According to one embodiment, a user may communicate power requirement or subcarrier preference information to the serving base station, which then selects a subcarrier from a group with sufficient power for that particular user's needs. A determination of a power requirement may use a comparison of the signal power from the serving base station with the signal power from a neighboring base station. Further, power requirement determinations may be updated, which may then drive a change in a user's subcarrier assignment within a cell or sector.

Embodiments of the invention provide for neighboring cells or sectors to use different subcarriers in the group with maximum power, so that neighboring cells or sectors may not be simultaneously transmitting the same subcarriers at the highest power level. For example, the subcarriers that are transmitted with highest power in one cell may be transmitted with a lower power in an adjacent cell. By avoiding the situation in which adjacent cells or sectors simultaneously transmit the same subcarriers at the highest power levels, inter-cell or inter-sector interference may be reduced. By reducing the interference, overall system efficiency and throughput may be enhanced.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawings, in which:

FIG. 3 shows a method for subcarrier assignment according to an embodiment of the invention.

FIG. 4 shows a base station adapted according to an embodiment of the invention.

DETAILED DESCRIPTION OF THE INVENTION

Figure 1:
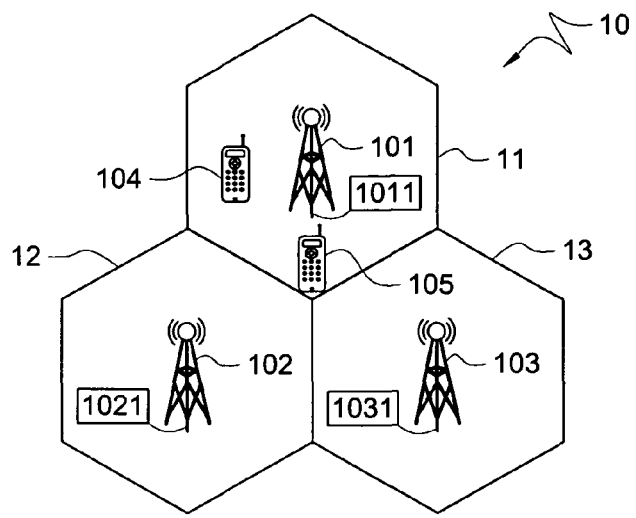
FIG. 1 shows a network system adapted according to an embodiment of the present invention.

FIG. 1 shows map 10 of three neighboring cells 11, 12 and 13, served by base stations 101, 102 and 103, respectively, with users 104 and 105 at different distances from serving base station 101 in cell 11. Controllers 1011, 1021 and 1031 control the operation of base stations 101, 102 and 103, respectively. User 104 is nearby base station 101, while user 105 is near the intersection of cell boundaries 106, 107 and 108.

Without downlink power control, user 105, who is relatively far from serving base station 101 and roughly equidistant from all three base stations 101, 102 and 103, may experience relatively strong interferences from neighboring base stations 102 and 103 under an equal downlink power system. In such a scenario, user 105 may be able to sustain only a low-capacity data link while occupying a large portion of system bandwidth, resulting in inefficient bandwidth usage. Additionally, user 105 might experience poor quality service or be subject to a service outage. Possible ways for user 105 to compensate for a low SIR include using a low rate coding scheme and using wide frequency spreading.

User 104 presents different issues under an equal downlink power system. Since user 104 is near the base station, user 104 is likely to experience a fairly high SIR. Unfortunately, if the SIR is higher than is really necessary to achieve adequate signal quality, the excess power consumed by base station 101 will not only be a waste of system resources, but will also contribute to the interference level in neighboring cells 12 and 13. This interference then potentially reduces the data transmission rates of any users in cells 12 and 13. Thus, equal with an downlink power system, valuable system resources, such as bandwidth and power, may be wasted, and the throughput of the overall system may not be optimized.

The system shown in FIG. 1 is, however, adapted to use an embodiment of the invention, and thus base station 101 transmits to 104 at a reduced power level as compared with an equal downlink power system. This reduction in transmit power to user 104 would reduce interference seen by users in cells 12 and 13, possibly allowing users in those cells to use a higher rate coding scheme. However, base station 101 would still provide adequate power to maintain an acceptable SIR for user 104. Further, user 105 would also see an increased SIR, because neither base station 102 nor 103 would be transmitting full power on the same subcarrier as the one used by user 105.

Each base station shown in FIG. 1 may provide a number of different subcarriers in order to serve multiple users. The subcarriers may be differentiated, for example, by differing frequencies or frequency-hopping schemes. With an equal downlink power system, all subcarriers will have identical power. However, it is not necessary for all subcarriers to be transmitted with the same power. Rather, the subcarriers are allocated into groups, according to an embodiment of the invention, such that each subcarrier within a group has the same transmit power level as other subcarriers within that same group, but from one group to another, the transmit power is different. That is, the groups will have consistent, but unequal transmit power.

The group allocations may be somewhat arbitrary, or may be optimized based on system environment and characteristics. In a particular cell, the number of different groups may be arbitrary, and may even change over time, based on system needs. For example, in a particular cell, historical usage patterns may indicate that with typical cell loading, a certain percentage of users are near the base station and require relatively little power, while another percentage of users tends to require maximum power due to distance from the base station. The power requirements may be divided into a number of ranges, and the expected number of users in each range may then be estimated.

The number of subcarriers in a particular group may be arbitrary, and also may even change over time. Further, the power levels assigned to the subcarriers of each group may not need to be stepped equally between a minimum and maximum level, but rather may be tailored as needed for a particular cell environment. From one cell to another, the group allocations, including the number of groups, the numbers of subcarriers in various groups, and group power profiles may be significantly different. Any of the allocation parameters may change dynamically without departing from the scope of the invention.

Controllers 1011, 1021 and 1031 control the group power levels and subcarrier assignments. They may also assist in collecting and analyzing the historical usage patterns that could be used for determining power level group characteristics. Further, controllers 1011, 1021 and 1031 may communicate with each other in order to allow dynamic changes in group allocations without the situation arising where two adjacent cells might assign the same subcarrier to the highest power level group.

Figure 2:
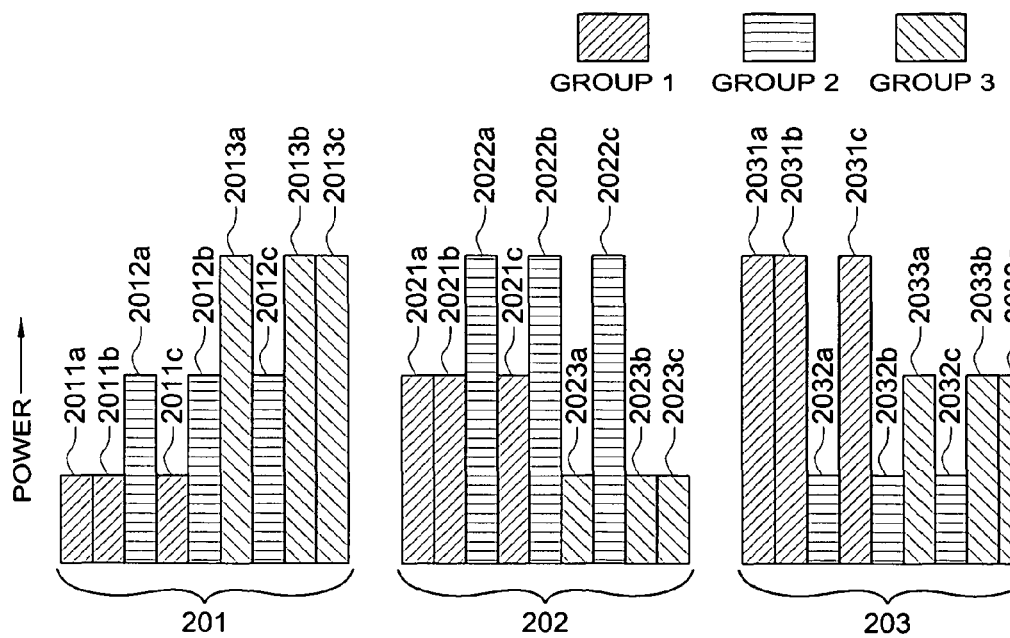
FIG. 2 shows a plot of subcarrier power-based groupings as may be implemented with respect to the network system of FIG. 1, according to an embodiment of the invention.

FIG. 2 shows a plot of the relative subcarrier powers for representative group allocations 201, 202 and 203 for the three different cells, 11, 12 and 13 of FIG. 1. FIG. 2 shows nine subcarriers for illustrative purposes, although an actual system could have any number of subcarriers. For example, a typical number of subcarriers for a Orthogonal Frequency Division Multiple Access (OFDMA) system may be 512 or 1024. Although the figures are described in terms of OFDMA subcarriers, embodiments of the invention could comprise any communication system with a channel reuse plan, and using any transmission scheme.

As shown, allocation 201 has nine subcarriers, 2011a-c, 2012a-c and 2013a-c divided into three groups: 2011, 2012 and 2013, with unequal transmit power. In each group of allocation 201, all subcarriers have equal power, but all groups have different power levels. That is, the groups have a consistent subcarrier power level that is different from a subcarrier power level of a different group. For example, subcarriers 2011a-c all have the same power as each other, but a different power level than groups 2012 and 2013.

Further, the groups in a particular cell may be defined, based in part on the groups of neighboring cells, such that only one of a group of neighboring cells or sectors transmits a particular subcarrier with the highest power level. For example, cells 11, 12 and 13, shown in FIG. 1, may all use the same set of subcarriers at the same frequencies. Allocation 202 has nine subcarriers, 2021a-c, 2022a-c and 2023a-c divided into three groups: 2021, 2022 and 2023, and allocation 203 has nine subcarriers, 2031a-c, 2032a-c and 2033a-c divided into three groups: 2031, 2032 and 2033. Cell 11 with allocation 201 has group 3 as the highest power level, cell 12 with allocation 202 has group 2 as the highest power level, and cell 13 with allocation 203 has group 1 as the highest power level.

Subcarriers 2013a, 2023a and 2033a may use the same frequencies, but due to the unequal power levels associated with their respective groupings, only 2013a will reach user 105, near the intersection of boundaries 106, 107 and 108 shown in FIG. 1, after being transmitted with maximum power. Compared with a system that transmits all subcarriers with equal downlink power, subcarriers 2011a and 2021a from neighboring base stations 102 and 103 of FIG. 1 will be transmitted at lower power levels, and therefore should reduce the level of interference experienced by user 105.

Since subcarriers with the highest power level would typically provide the best SIR for users near a cell boundary, the lower power subcarriers would likely be used for users that are closer to the base station. For example, since user 104 of FIG. 1 is nearby base station 101, user 104 would likely be assigned a subcarrier from either group 2011 or 2012. User 104 should still receive adequate signal strength, even with reduced transmission power, due to the short distance from base station 101. As a user moves in a cell or sector, if the user's power requirement changes, the subcarrier assignment would typically change, rather than the power level of the subcarrier itself changing. This allows user mobility within the cell, which changes user power requirements, while preserving the advantages of the reuse plan described above.

Compared with a custom-tailored power system, the grouping scheme allows for a simpler implementation, with a reduced bandwidth demand for the power control. That is, the group allocations may be determined from another feedback mechanism other than individual user SIR reporting. Possibilities include system loading and usage profile histories, uplink strength, or any other acceptably reliable method for predicting the likely transmit power needs for multiple users. Cell or system loading histories may include the power levels required by users in a particular cell, and the number of users with power requirements within certain ranges. These historical need ranges may, under proper circumstances, be used for predicting likely needs at a future time. Cell loading history, however, is a possible, rather than necessary, way of determining the number and power levels of the groups. By removing the need for continual individual feedback, and using an alternative method for estimating power needs, system bandwidth may be used more efficiently.

As another comparison, if the total transmit power for the unequal power group system was the same as that for an equal power system, more power would be available for the subcarrier group having the highest power in the unequal power system. This would additionally improve the signal-to-noise (SNR) ratio of users near a cell boundary, where noise includes unwanted signals in addition to interfering signals from neighboring base stations.

The power groups may be predetermined, or may adapt, if necessary to increase or decrease the number of subcarriers in a particular group. A base stations may monitor the power allocations of neighboring base stations for either its own power grouping initialization, or else to assist in tailoring changes to the power groups. Thus, a base station may dynamically define or modify its power groups in response to the neighboring power groups. As a further system enhancement, the various base stations may be centrally-controlled, in order to optimize efficiency on a system-wide level.

Subcarrier assignment may be made using a method such as method 30, shown in FIG. 3. A new user enters the system in box 301, and needs assignment information in box 302. Various approaches may be used for estimating interference parameters without departing from the spirit and scope of the invention. For example, a user can estimate subcarrier SNRs in box 303a, estimate relative base station signal strength using pilot data in box 303b, or identifies acceptable subcarriers in box 303c. It should be noted that in many cases, a comparison of signal strength between signals originating at different locations may indicate the ratio of the user's distances from the different locations. Also, a user's identification of acceptable subcarriers may include a preferential order for requested assignment for those subcarriers providing a signal quality satisfying a minimum threshold. The user relates assignment information in box 304. The power level groups are defined in box 305, which may have occurred before box 301, or else box 305 may be revisited to refine group definitions during system operation. In any case, with groups defined, a subcarrier is assigned to the new user in box 305. Since the user's power requirements may change, the method may return to box 302 for updating the assignment information.

FIG. 4 shows base station controller 1011 comprising memory 401 and controlling transmitter 402. Memory 401 may be used to store information necessary for the operation of controller 1011, including group definitions and user requests, and optionally adjacent cell group definitions and usage statistics. Controller 1011 may operate alone, in conjunction with other controllers, such as controllers 1021 and 1031 shown in FIG. 1, or else may be linked to optional system controller 403, which provides system-level planning and control for multiple base stations.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method of wireless communication power control comprising:

allocating a first plurality of subcarriers into a first plurality of groups, subcarriers within each group of said first plurality of groups having a consistent subcarrier power level, said each group of said first plurality of groups having a different subcarrier power level from other groups of said first plurality of groups;

allocating a second plurality of subcarriers into a second plurality of groups, subcarriers of each group of said second plurality of groups having a same subcarrier power level, said each group of said second plurality of groups having a different subcarrier power level, wherein a group with a highest subcarrier power level in said second plurality of groups uses different subcarriers than a group with a highest subcarrier power level in said first plurality of groups;

receiving at a first transmit location and from a first receive location a determined suitable subcarrier power level, wherein said determined suitable subcarrier power level is based at least in part on a comparison of a signal power of a first signal received at said first receive location and transmitted from said first transmit location with a signal power of a second signal received at said first receive location and transmitted from a second transmit location; and assigning one subcarrier of said first plurality of subcarriers to a wireless communication link connecting said first transmit location with said first receive location; wherein said one subcarrier is selected based on said consistent subcarrier power level of a group said one subcarrier belongs to and said suitable subcarrier power level.

2. The method of claim 1, wherein said act of allocating said second plurality of subcarriers into a second plurality of groups is dynamic allocation using allocation information for said first plurality of groups.

3. The method of claim 1, wherein a first communication device at said first transmit location communicates using said first plurality of groups and a second communication device at said second transmit location communicates using said second plurality of groups.

4. The method of claim 1, further comprising:
estimating an interference parameter using said comparison of a signal power of a first signal received at said first receive location and transmitted from said first transmit location with a signal power of a second signal received at said first receive location and transmitted from a second transmit location.

5. The method of claim 1, wherein a communication device at said first transmit location assigns a first subcarrier from said first plurality of groups for use in a first sector of a cell and assigns a second subcarrier from said first plurality of groups for use in a second sector of said cell.

6. The method of claim 1, further comprising:
receiving an updated suitable subcarrier power level; and
assigning to said wireless communication link a new subcarrier from a different group of said first plurality of groups based on said updated suitable subcarrier power level.

7. The method of claim 1, wherein said wireless communication link uses Orthogonal Frequency Division Multiple Access (OFDMA).

8. The method of claim 1, further comprising:
determining groups of said first plurality of groups to be used for subcarrier allocation in a cell; and
determining power levels for said determined groups of said first plurality of groups to be used for subcarrier allocation in said cell.

9. The method of claim 8, wherein said determining said power levels for said determined groups of said first plurality of groups to be used for subcarrier allocation in said cell comprises predicting cell loading.

10. The method of claim 8, further comprising:
updating said act of determining said power levels for said determined groups of said first plurality of groups to be used for subcarrier allocation in said cell;

determining updated power levels for said determined groups of said first plurality of groups to be used for said subcarrier allocation in said cell; and
adjusting subcarrier group assignment of said first plurality of groups.

11. A system for wireless communication power control comprising:

a first transmitter at a first transmit location, said first transmitter transmitting a first plurality of wireless communication channels, wherein said first plurality of channels is allocated into a first plurality of groups, channels within each group of said first plurality of groups having a consistent transmit power level, said each group of said first plurality of groups having a different transmit power level from other groups of said first plurality of said groups;

a first controller, said first controller operable to assign one of said first plurality of channels for a first wireless communication link between a mobile station and said first transmitter, wherein said assignment is based, at least in part, upon a power level requirement received from said mobile station and said consistent transmit power level of a group said one of said first plurality of channels belongs to, said power level requirement being based, at least in part, upon a comparison of a signal power of a first signal received at said mobile station from said first transmitter with a signal power of second signal received at said mobile station from a second transmitter over said one of said first plurality of channels, wherein said second transmitter is at a second transmit location, said second transmitter transmitting a second plurality of wireless communication channels, wherein said second plurality of channels is allocated into a second plurality of groups, channels of each group of said second plurality of groups having a same transmit power level, said each group of said second plurality of groups having a different transmit power level, and wherein a group with a highest transmit power level in said second plurality of groups uses different channels than a group with a highest transmit power level in said first plurality of groups; and a second controller operable to assign one of said second plurality of channels for a second wireless communication link.

12. The system of claim 11, wherein said first controller is further operable to determine a suitable power level for said first wireless communication link.

13. The system of claim 12, wherein said first controller is further operable to change said assignment when said suitable power level changes.

14. The system of claim 11, wherein said first controller is further operable to modify said allocation of said first plurality of channels.

15. The system of claim 11, wherein said second controller is further operable to determine a power level suitable for said second wireless communication link.

16. A system for wireless communication power control comprising:
a first transmitter adapted for simultaneously transmitting multiple wireless signals to multiple users from a first location;
at least one controller adapted for controlling said transmission of said multiple signals; and said at least one controller adapted for allocating said multiple signals into a first plurality of groups, signals within each group of said first plurality of groups having a consistent transmit power level, said each group of said first plurality of groups having a different transmit power level from other groups of said first plurality of said groups;

wherein said allocation by said at least one controller adapted for allocating said multiple signals into said first plurality of groups is based, at least in part, upon one or more power level requirements received from one or more of said multiple users receiving said multiple signals and respective consistent transmit power level of said each group of said first plurality of groups said multiple signals belongs to, said one or more power level requirements being based, at least in part, upon a comparison of a signal power of a first signal received at said one or more of said multiple users and transmitted from said first transmitter with a signal power of a second signal received at said one or more of said multiple users and transmitted from a second transmitter;

wherein said first transmitter is further adapted for simultaneously transmitting said multiple wireless signals to said multiple users from a second location; and wherein said at least one controller is further adapted for controlling said transmission by said first transmitter, wherein said multiple signals are allocated into a second plurality of groups, signals of each group of said second plurality of groups having a same transmit power level, said each group of said second plurality of groups having a different transmit power level.

17. The system of claim 16, wherein a group with a highest transmit power level in said second plurality of groups uses different channels than a group with a highest transmit power level in said first plurality of groups.

\* \* \* \* \*

UNITED STATES PATENT AND TRADEMARK OFFICE
CERTIFICATE OF CORRECTION

PATENT NO. : 8,320,396 B2
APPLICATION NO. : 11/491470
DATED : November 27, 2012
INVENTOR(S) : Manyuan Shen et al.

It is certified that error appears in the above-identified patent and that said Letters Patent is hereby corrected as shown below:

In the Claims:

Column 7:
Line 18, Claim 1, insert --determined-- after "said"; and
Line 20, Claim 2, delete "act of" after "said".

Signed and Sealed this
Tenth Day of September, 2013

Teresa Stanek Rea
*Acting Director of the United States Patent and Trademark Office*

UNITED STATES PATENT AND TRADEMARK OFFICE
CERTIFICATE OF CORRECTION

| | | |
|---|---|---|
| PATENT NO. | : 8,320,396 B2 | Page 1 of 1 |
| APPLICATION NO. | : 11/491470 | |
| DATED | : November 27, 2012 | |
| INVENTOR(S) | : Shen et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 731 days.

Signed and Sealed this
Eleventh Day of November, 2014

Michelle K. Lee
*Deputy Director of the United States Patent and Trademark Office*